United States Patent [15] 3,650,686
Hudson et al. [45] Mar. 21, 1972

[54] PROCESS FOR RECOVERY OF PHOSPHOROUS VALUES FROM DILUTE PLANT EFFLUENTS

[72] Inventors: Robert B. Hudson, St. Louis, Mo.; Robert E. Mesmer, Oak Ridge, Tenn.; Roger A. Rose, St. Louis, Mo.

[73] Assignee: Monsanto Company, St. Louis, Mo.

[22] Filed: Aug. 18, 1969

[21] Appl. No.: 851,047

[52] U.S. Cl. ................................................23/109, 210/42
[51] Int. Cl. .....................................C01b 25/32, C02c 5/02
[58] Field of Search ................23/109, 165, 108; 210/53, 42

[56] References Cited

UNITED STATES PATENTS 1,851,210   3/1932   Palazzo et al. ........................23/109 X
2,271,361   1/1942   Carpenter et al. .......................23/109
2,343,456   3/1944   Henninger ...............................23/109
3,259,567   7/1966   Dunning et al. ......................210/53 X
3,467,495   9/1969   Nielsson ..................................23/108
3,511,600   5/1970   Kim .........................................23/109

Primary Examiner—Oscar R. Vertiz
Assistant Examiner—Charles B. Rodman
Attorney—Herbert B. Roberts and Neal E. Willis

[57] ABSTRACT

The process of recovering phosphorus values from plant effluents by precipitating the phosphorus values with lime to obtain a sludge which is difficult to handle is improved by treating the sludge with phosphoric acid so as to convert phosphorus values in the sludge from basic calcium phosphate to crystalline calcium phosphates which are readily filterable and useful as an animal feed supplement.

7 Claims, No Drawings

PROCESS FOR RECOVERY OF PHOSPHOROUS VALUES FROM DILUTE PLANT EFFLUENTS

BACKGROUND OF THE INVENTION

This invention relates to the recovery of phosphorus values from dilute plant effluents. It is desirable from the standpoint of plant economies and/or pollution control to recover from dilute plant effluents whatever small amounts of phosphate values may be present in the effluent. Among the processes devised is that of treating the plant effluent with lime so as to precipitate the phosphate value as a basic calcium phosphate and draining off as much of the supernatant water as possible. However, the resulting phosphate precipitate is a very thick viscous sludge which is not easily handled and in itself presents a storage problem there being no real use for the resulting material. That being so, it is obvious that over a course of time the settling ponds would become filled with the phosphate value or sludge necessitating more and more settling ponds which would eventually be filled up with a material of no real value.

It is an object of this invention to provide a method for converting the basic calcium phosphate sludge to a material which can be handled more easily.

It is the further object of this invention to convert the nonuseful calcium phosphate sludge into a useful product of commerce. The foregoing objects and other objects which will be readily apparent to those of skill in the art are described in the foregoing specification.

SUMMARY OF THE INVENTION

In a process for the recovery of phosphorus values from an effluent stream containing dilute soluble phosphate values by adding lime to form and precipitate basic calcium phosphate having a general formula $Ca_{10-x}(PO_4)_6OH)_{2-x}(H)_x \cdot 2.5XH_2O$ and thereafter draining the excess water to obtain a sludge, the improvement which comprises slurrying the sludge with a substantially equivalent amount (on $P_2O_5$ basis) of phosphoric acid to form crystalline calcium phosphate dihydrate whereby a compound readily filterable and easily removed from the effluent is obtained. The resulting calcium phosphate dihydrate after conventional dewatering process is ready for use as a conventional feed supplement.

DESCRIPTION OF THE PREFERRED EMBODIMENTS

In recent years it has become increasingly clear that it would be desirable to remove nutrients, including phosphorus compounds, from effluent waters which are introduced into our streams and lakes to prevent over-fertilization of the inland waters, and much attention is presently being given to suitable methods for removing such nutrients. Lime has been used to precipitate basic calcium phosphates such as hydroxy apatite and octacalcium phosphate from dilute sodium phosphates solution. It is generally experienced that these precipitates are largely amorphous or at best agglomerates of very small crystals having exceedingly high suitable areas making filtration and water removal difficult and costly. A process has been found by which this undesirable characteristic can be circumvented.

The phosphate values in effluent liquids are largely in the form of orthophosphates but may comprise a substantial proportion of polyphosphate.

The phosphate values are precipitated from a phosphate solution at a pH below 10 using slaked lime in the mole ratio of Ca/P of at least 1.67/1 and preferably 1.9-2.1/1. All phosphate species are readily precipitated under these conditions. The sludge from this precipitation which contains essentially all of the calcium and phosphate can be thickened to about 10% solid by weight and can be further dewatered only to about 20 or 30% solids by centrifugation or filtration.

It has now been found that this sludge can be converted into an easily dewatered product of commercial value in a simple, but extremely novel, manner. The sludge described above is slurried with concentrated phosphoric acid. The resulting calcium phosphate material can be filtered quite readily to produce a filter cake containing up to 60% solids. Thereafter, the cake is dried using conventional techniques to obtain the commercial product with the desired amount of moisture content. The filtrate is recycled to the basic calcium phosphate precipitation step to recover the phosphate values.

The phosphoric acid should have a $P_2O_5$ content substantially equivalent to the amount of $P_2O_5$ in the effluent sludge plus that amount required to neutralize any excess lime or other bases present in the sludge. The acid should be defluorinated if a cattle food supplement is desired. The percent $P_2O_5$ in the acid can be varied as desired; condensed acids made by concentrating wet precess $H_3PO_4$ are generally low in fluorine. The $P_2O_5$ content of the acid employed will range somewhere between about 30% and to about 85% $P_2O_5$ by weight for the condensed acid. If condensed acids are used, some $Ca_2P_2O_7$ may be found in the product.

The temperature at which the sludge containing basic phosphate is slurried with phosphoric acid is influenced by the desired end product. When a temperature from about 10° C. to about 40° C. is utilized dicalcium phosphate dihydrate is obtained. Anhydrous dicalcium phosphate is the principal product when the temperature is from about 70° C. to about 100° C. AT the intermediate temperatures of 40° to 70° C. a mixture of the two foregoing phosphates is obtained.

The freshly precipitated basic calcium phosphates can be prepared by the following novel method. A lime slurry is prepared by slaking quicklime. The water used in preparing the slurry may be effluent water containing phosphorus values. The lime slurry and additional effluent water containing phosphorus values are then charged to a primary reactor in such a ratio that a substantial portion of the lime remains unreacted at the end of the resident time in the reactor. The primary reactor continuously overflows to a secondary reactor where additional effluent water is charged in a ratio such that almost all of the lime is reacted with the phosphorus values, i.e., there remains some free lime in the resulting sludge. The secondary reactor also continuously overflows and is discharged to a shallow settling basin or other thickening device.

The freshly precipitated basic calcium phosphates react readily with the phosphoric acids under the foregoing conditions and when employing a batch process a reaction period of 30 minutes is adequate. It will be obvious to one of ordinary skill in the art that this process can be adapted to a continuous process with only routine experimentation by one of ordinary skill in the art and typical equipment. It is found that good crystalline precipitate is formed when the end point for the batch neutralization varies from as low as pH 4 to as high as pH 9. It is generally preferred to neutralize to pH 6.5—7.5. Low pH values leave a high soluble $P_2O_5$ content in the recycled filtrate while the crystallinity of the basic calcium phosphates precipitated above pH 7 becomes increasingly poor.

In continuous processing, best crystallinity is obtained at pH end points of 5 to 6 for a single stage reactor. A two-stage reaction can be carried to pH 7 with good crystallinity.

The process thus described is capable of reducing the phosphate ($P_2O_5$) content of plant effluent from as high as 50,000 p.p.m. to less than 1 p.p.m. and is routinely employable to reduce the $P_2O_5$ in the final effluent to less than 5 p.p.m.

The invention is demonstrated by the representative examples described herein. It will be understood that variations in technique will readily occur to those skilled in the art and that such variations can be made without departing from the invention.

EXAMPLE 1 (Comparative)

A series of experiments were carried out to demonstrate the nature of the basic calcium phosphates and several process modifications. Lime was added to the phosphate-bearing water as a freshly prepared slurry of $Ca(OH)_2$ at 13% solids.

Phosphate-bearing water was a solution of a mixture of sodium orthophosphates and polyphosphates such that the pH was 7 and 90% of the total $P_2O_5$ was present as orthophosphate at concentrations as indicated in Table 1 below. Three different methods of contracting the phosphate-containing water with lime slurry are given.

1. Single Stage Contact 800 ml. of phosphate-bearing water was placed in a 2000 ml. beaker equipped with a variable speed stirrer having a chord-shaped agitator 10 cm. long by 2.5 cm. a mid-chord. Lime slurry was added rapidly and mixed with the water at an agitator speed of 100 r.p.m. This was followed by agitation at 50 r.p.m. for 10 minutes to flocculate the precipitate. After flocculation the precipitate was allowed to settle for 10 minutes before any sample was withdrawn.

2. Sludge Recycle Simulation of a Commercial Reactor-Clarifier

This batchwise simulation was done in the same equipment as the single-stage procedure. The single-stage procedure was followed and after 10 minutes settling, the supernatant liquid layer was decanted. A fresh charge of lime slurry was then added to the sludge and mixed at 100 r.p.m. for 2 minutes. A second 800 ml. charge of phosphate-bearing water was then added and the 5-minute mixing, 10-minute flocculation, and 10-minute settling sequence was repeated. The cycle could be repeated indefinitely if sludge is withdrawn periodically but only 2 cycles were used for this work except where noted otherwise.

3. Two-stage Parallel Reaction

This scheme used the equipment previously described to simulate a two-stage continuous reactor system. All of the lime slurry is mixed rapidly for 5 minutes with half of the phosphate-bearing water. Initial production of a lime-rich slurry reduced deactivation of the lime by surface coating and furnishes nucleating centers. The remaining half of the water is then added, mixed and flocculated for 30 minutes before settling. The two-stage and sludge recycle procedures yielded somewhat better $P_2O_5$ removal than the single-stage procedure. Contrary to expectation from the trade literature, little difference in solids settling characteristics were found that could be attributed to the type of process. This is probably due to the relatively high phosphate concentration of the water.

TABLE I

Comparison of lime-treatment processes

| Process | Phosphate concentration mg./l. as P | | Percent removal | Solids content of slurry after 24 hrs. settling, percent |
|---|---|---|---|---|
| | Initial | Residual | | |
| Single-stage | 1,800 | 41 | 98 | 7.5 |
| Two-stage | 3,600 | 7.7 | 99+ | 11.8 |
| Sludge recycle | 1,800 | 4.5 | 99+ | 8.0 |
| | 3,600 | 2.2 | 99+ | 10.5 |

Notes.—(1) Ca/P mole ratio=2.0. (2) Total contact time=ca. 30 minutes. (3) Pebble quicklime slaked at 90° C.

TABLE II

Effect of Initial Phosphate Concentration

On Settling and Dewatering

| Initial Phosphate Concentration mg./l. as P | Solids Content (w/v) of Settled Slurry | |
|---|---|---|
| | After 24 hr. | After 1 week |
| 450 | 2% | No data |
| 900 | 4% | No data |
| 1,800 | 8% | 19% |
| 3,600 | 10% | 23% |
| 5,400 | 12% | 25% |
| 22,500 | 16% | 33% |

Notes

1. Ca/P mol ratio=2.0

2. 2-stage procedure

3. % solids (w/v) = (g. Solids × 100)/(ml. slurry).

This illustrates the effect of process and concentration on basic calcium phosphate.

EXAMPLE 2 (Comparative)

Supernatant water was decanted from a portion of the basic calcium phosphate slurry from the two-stage reaction as shown in Example 1 after 24 hours settling. The settled slurry was 11.8% solids. One hundred ml. of this slurry was filtered on a 11 cm. vacuum filter with suction at 30 mm. Hg absolute. Suction was supplied for 15 minutes until the filter cake was dewatered and shrinkage cracks developed. The resulting wet cake contained 73% water as determined by drying loss at 150° C. The resulting dried cake was examined by X-ray diffractive and found to be largely amorphous or very poorly crystalline. Very weak diffraction patterns for hydroxyapatite and $Ca(OH)_2$ were the only crystalline components that could be detected. This illustrates the poor crystallinity and difficulty in dewatering basic calcium phosphates.

EXAMPLE 3 (Comparative)

An effluent treatment plant was operated to remove the soluble phosphate from an industrial plant effluent. The effluent stream was fed from a surge pond to the treatment plant at 150 g.p.m. averaging 3,500 mg./l. of soluble phosphate expressed as P. The water stream was continuously divided into three streams with 20 g.p.m. used for slaking pebble quicklime, 55 g.p.m. added into a primary reactor and 75 g.p.m. added into the secondary reactor. Slaked lime overflowed the slaker continuously into the primary reactor which overflowed continuously into the secondary reactor which, in turn, overflowed into shallow settling basins. Sojourn time in the lime slaker was 30 minutes, in the primary reactor 15 minutes, and in the secondary reactor, 30 minutes. Agitation in the slaker and primary reactor was vigorous while gentle agitation was used in the secondary reactor to promote flocculation. The lime feed to the slaker was proportioned to the $P_2O_5$ content of the feed water to maintain a Ca/P ratio of 2/1. The sludge settled rapidly and a clear effluent was obtained that contained less than 1 mg./l. of P. When settled solids had accumulated in the settling basin to a depth of 18 inches, the slurry was diverted to a second basin and it was left to drain and air-dry for 90 days. The sludge, after 90 days had a water content of 70 percent to 76% and the consistency of still mud. This mud was removed from the basin with a front end loader and piled on a nearby cinder fill. After 6 months of additional drying, the mud in the pile was thixotropic and had a water content of up to 65%. Because of its thixotropic nature, the sludge has no known commercial value and is expensive to dispose of in landfill operations. This is another illustration of the difficulty of dewatering and disposing of basic calcium phosphate sludges.

EXAMPLE 4

A quantity of 24 hour settled sludge at 10.5% solids obtained from the experiments described in Table 1 was poured slowly into reagent grade phosphoric acid (54% $P_2O_5$) at 40° C. with vigorous agitation until the pH reached 6.5. The sludge was added over a 15 minute period. The slurry was stirred for an additional 15 minutes during which time small additions of slurry were added to bring the final pH to 7.0. After only 10 minutes settling without agitation, the settlee slurry was 18% solids (w/v). The supernatant liquid was decanted and 100 ml. of slurry was filtered and dried as described in Example 2 Filtration was complete in 5 minutes and the water content of the wet cake was only 42%. X-ray diffraction of the dried material showed it to be strongly crystalline and essentially all $CaHOP_4 \cdot 2H_2O$. This material was more than 30% plus 100 mesh and 50% plus 270 mesh in particle size. The filtrate contained 1,100 mg./l. soluble P.

EXAMPLE 5

The experiment described in example 4 was repeated with the exception that the reaction temperature was held at 70° C. In this case, the filtration required 8 minutes to complete, the wet cake contained 53% water and the dried product was anhydrous $CaHPO_4$ rather than the dihydrate. These examples show the great improvement in dewatering that can be obtained by converting the amorphous basic calcium phosphates to crystalline dicalcium phosphate.

While the invention has been described with particular reference to the preferred embodiments thereof, it will be appreciated that variations from the details given herein can be effected without departing from our invention and its broadest aspects.

What is claimed is:

1. In a process for the recovery of phosphorus values from an effluent liquid stream containing dilute soluble phosphate values by adding a lime to form a basic calcium phosphate containing precipitate and removing sufficient water from the resulting liquid-precipitate mixture to form a sludge, the improvement which comprises slurrying, at a temperature of about 10° C. to about 100° C., said sludge with sufficient phosphoric acid to result in the slurry having a pH of from pH 4 to pH 9 whereby dicalcium phosphate containing solids are formed, and thereafter recovering said dicalcium phosphate containing solids from the slurry.

2. The process of claim 1 wherein the sludge-phosphoric acid slurry during the formation of said dicalcium phosphate containing solids is maintained at a temperature of about 10° C. to about 40° C. whereby dicalcium phosphate dihydrate is formed.

3. The process of claim 1 wherein the sludge-phosphoric acid slurry during the formation of said dicalcium phosphate containing solids is maintained at a temperature of about 70° C. to about 100° C. whereby anhydrous dicalcium phosphate is formed.

4. The process of claim 1 wherein the sludge-phosphoric acid slurry during the formation of said dicalcium phosphate containing solids is maintained at a temperature of about 40° C. to about 70° C. whereby a mixture of dicalcium phosphate dihydrate and anhydrous dicalcium phosphate is formed.

5. The process of claim 1 wherein the phosphoric acid contains from about 30 to about 85 percent by weight $P_2O_5$ and wherein an amount of phosphoric acid is employed such that said slurry has an end pH of from 6.5 to 7.5, inclusive.

6. The process of claim 5 wherein the principal constituent of the phosphoric acid is orthophosphoric acid and wherein said slurry is formed by addition of said sludge to said phosphoric acid.

7. A process for the recovery of phosphorus values from an effluent liquid stream containing dilute soluble phosphate values comprising 1. preparing a lime slurry by slaking quicklime with said effluent stream,
2. reacting in a primary reactor said lime slurry with additional amounts of said effluent stream in such a ratio that a substantial amount of the lime slurry remains unreacted to obtain a primary reaction mixture,
3. reacting in a secondary reactor said primary reaction mixture with additional amounts of said effluent stream to obtain a sludge containing small amounts of unreacted lime,
4. adding the sludge to and reacting it with sufficient phosphoric acid to provide in the resulting mixture a pH of from pH 4 to pH 9 whereby crystalline calcium phosphate is formed, and
5. recovering the crystallized calcium phosphate.

* * * * *